US011487623B2

(12) United States Patent
Nishikai et al.

(10) Patent No.: US 11,487,623 B2
(45) Date of Patent: Nov. 1, 2022

(54) INFORMATION PROCESSING SYSTEM

(71) Applicant: KYOCERA Document Solutions Inc., Osaka (JP)

(72) Inventors: Kazuki Nishikai, Osaka (JP); Yuichi Obayashi, Osaka (JP); Satoshi Goshima, Osaka (JP); Yasuo Nakashima, Osaka (JP); Koki Nakajima, Osaka (JP); Takeshi Nakamura, Osaka (JP); Dukil Park, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/893,756

(22) Filed: Jun. 5, 2020

(65) Prior Publication Data
US 2020/0387428 A1 Dec. 10, 2020

(30) Foreign Application Priority Data

Jun. 7, 2019 (JP) .............................. JP2019-106993

(51) Int. Cl.
*G06F 11/00* (2006.01)
*G06F 11/14* (2006.01)
(52) U.S. Cl.
CPC ...... *G06F 11/1438* (2013.01); *G06F 2201/82* (2013.01)
(58) Field of Classification Search
CPC ............. G06F 11/3055; G06F 11/1438; G06F 11/203; G06F 2201/81; G06F 2201/82
See application file for complete search history.

(56) References Cited

U.S. PATENT DOCUMENTS

| 7,730,489 | B1* | 6/2010 | Duvur ................. G06F 11/2028 718/104 |
| 9,652,326 | B1* | 5/2017 | Bauer ................... G06F 11/203 |
| 10,289,446 | B1* | 5/2019 | Karppanen ........... G06F 9/4887 |

(Continued)

FOREIGN PATENT DOCUMENTS

JP 2018-133764 8/2018

OTHER PUBLICATIONS

EPO, Extended European Search Report of EP 20178495.6 dated Oct. 14, 2020.

*Primary Examiner* — Loan L. T. Truong
(74) *Attorney, Agent, or Firm* — Lex IP Meister, PLLC

(57) ABSTRACT

A remote management system includes a device management service having multiple instances that performs parallel distributed processing through the instances and a worker service having multiple instances that performs parallel distributed processing through the instances. Each instance of the device management service acquires the status of processing related to the recovery of the relevant instance from counter information, and stores the status of the processing related to the recovery of the relevant instance in the counter information when having performed the processing. Each instance of the worker service acquires the status of processing related to the recovery of an instance of the device management service from the counter information, and stores the status of the processing related to the recovery of the instance of the device management service in the counter information when having performed the processing.

4 Claims, 11 Drawing Sheets

(56) References Cited

U.S. PATENT DOCUMENTS

| | | | |
|---|---|---|---|
| 10,482,069 B1* | 11/2019 | Barnes | G06F 11/2046 |
| 10,528,427 B1* | 1/2020 | Kataki | H04L 41/0668 |
| 10,721,146 B2* | 7/2020 | Jayaprakash | G06F 11/3003 |
| 10,938,782 B1* | 3/2021 | Harland | H04L 63/10 |
| 2004/0133674 A1 | 7/2004 | Sasaki | |
| 2005/0179931 A1 | 8/2005 | Yamaguchi et al. | |
| 2006/0136686 A1 | 6/2006 | Cherkauer et al. | |
| 2011/0099146 A1* | 4/2011 | McAlister | G06F 11/2069 707/634 |
| 2012/0131639 A1* | 5/2012 | Alex | H04L 67/148 726/3 |
| 2012/0246212 A1* | 9/2012 | Ahmad | H04L 65/80 709/201 |
| 2013/0124669 A1* | 5/2013 | Anderson | H04L 43/0876 709/217 |
| 2014/0059209 A1* | 2/2014 | Alnoor | G06F 11/1438 709/224 |
| 2015/0026086 A1* | 1/2015 | Adeli-Nadjafi | G06Q 10/1053 705/321 |
| 2015/0212901 A1* | 7/2015 | Aggarwal | G06F 11/0778 714/15 |
| 2015/0378809 A1* | 12/2015 | Bhaumik | G06F 11/0793 714/15 |
| 2017/0149864 A1* | 5/2017 | Feiman | H04L 67/10 |
| 2018/0165185 A1* | 6/2018 | Boshev | G06F 11/0793 |
| 2019/0163584 A1* | 5/2019 | K | G06F 11/2048 |
| 2020/0007620 A1* | 1/2020 | Das | H04L 67/62 |

\* cited by examiner

FIG. 3

62a COUNTER INFORMATION

| INSTANCE ID | COUNTER VALUE | TIME | ... |
|---|---|---|---|
| 00001 | 3 | 2019/05/27 13:30:55 | ... |
| 00002 | -2 | 2019/05/27 13:29:42 | ... |
| 00003 | 0 | 2019/05/27 13:31:23 | ... |
| ... | ... | ... | ... |

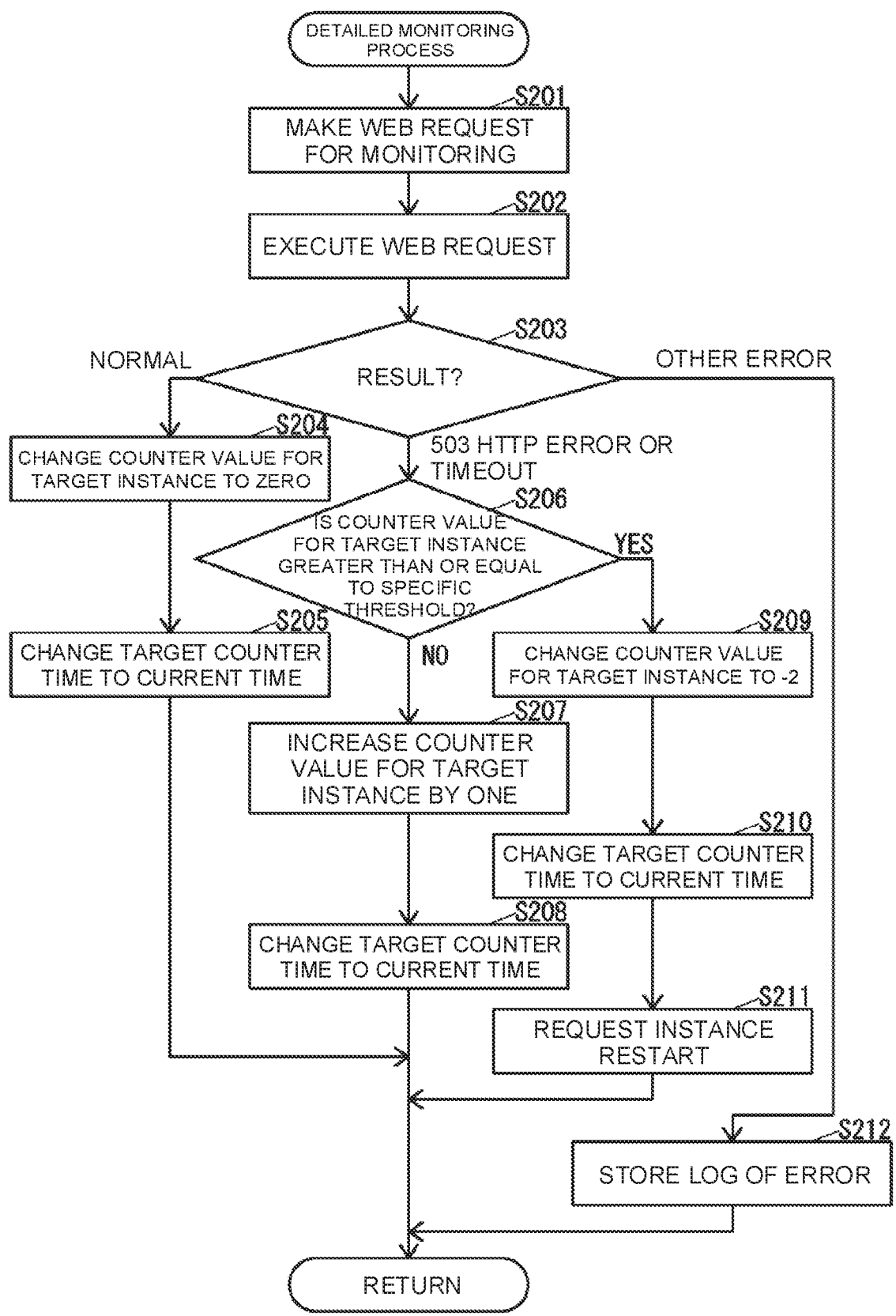

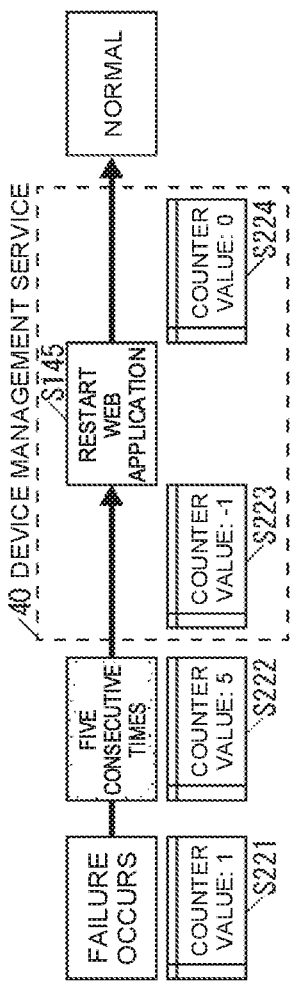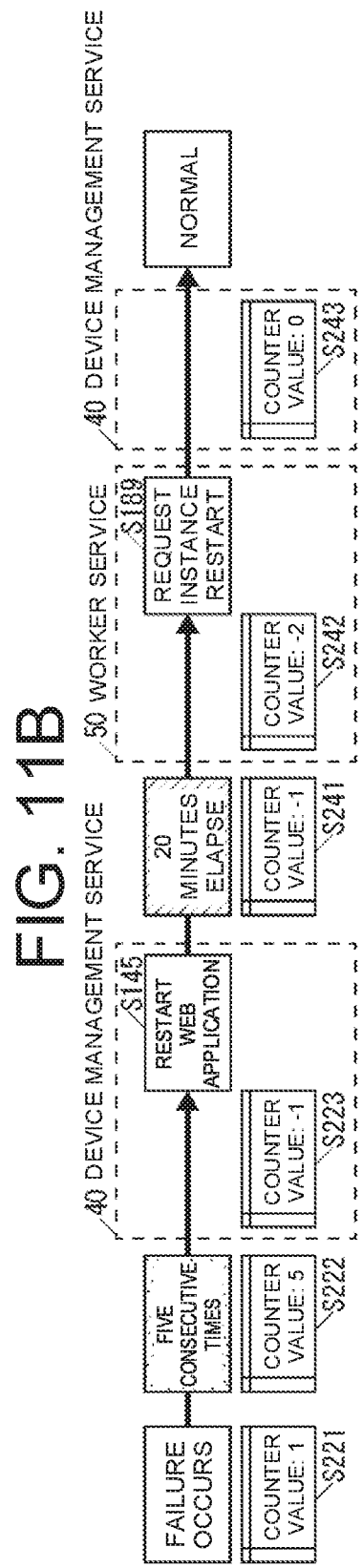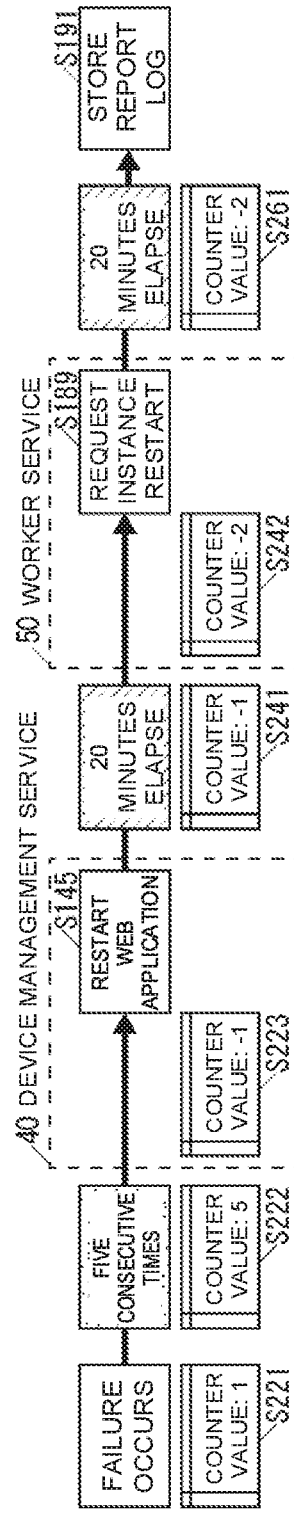

INFORMATION PROCESSING SYSTEM

INCORPORATION BY REFERENCE

This application is based upon, and claims the benefit of priority from, corresponding Japanese Patent Application No. 2019-106993 filed in the Japan Patent Office on Jun. 7, 2019, the entire contents of which are incorporated herein by reference.

BACKGROUND

Field of the Invention

The present disclosure relates to an information processing system that can autonomously recover after a failure.

Description of Related Art

It is known that, conventionally in a public cloud, when a failure occurs and is detected in an active information processing system, the Internet Protocol (IP) is changed from the active information processing system to a standby information processing system so as to continue to provide the service of the active information processing system through the standby information processing system. However, in the conventional techniques, the standby information processing system is necessary and the operating costs are increased by the use of the standby information processing system.

SUMMARY

An information processing system according to the present disclosure includes a first parallel distributed processing system that has two or more instances and performs parallel distributed processing through the two or more instances, a second parallel distributed processing system that has two or more instances and performs parallel distributed processing through the two or more instances, and a processing status storage unit that stores processing status information indicating a status of processing related to a recovery of the two or more instances of the first parallel distributed processing system for each instance of the first parallel distributed processing system. Each instance of the first parallel distributed processing system acquires the status of the processing related to the recovery of the two or more instances of the first parallel distributed processing system from the processing status information, and stores the status of the processing related to the recovery of the two or more instances of the first parallel distributed processing system in the processing status information when having performed the processing. Each instance of the second parallel distributed processing system acquires the status of the processing related to the recovery of the two or more instances of the first parallel distributed processing system from the processing status information, and stores the status of the processing related to the recovery of the two or more instances of the first parallel distributed processing system in the processing status information when having performed the processing.

In the information processing system of the present disclosure, an instance of the first parallel distributed processing system may restart an application of the instance itself as processing related to a recovery of the instance itself when it is indicated in the processing status information that a status of monitoring of a failure in the instance of the first parallel distributed processing system by an instance of the second parallel distributed processing system has become a specific status.

In the information processing system of the present disclosure, the instance of the second parallel distributed processing system may request a restart of the instance of the first parallel distributed processing system when it is not indicated in the processing status information even if a specific period of time has elapsed from a restart of the application of the instance of the first parallel distributed processing system that the restart of the application has successfully been achieved.

In the information processing system of the present disclosure, the instance of the second parallel distributed processing system may perform processing to report that an autonomous recovery process was unsuccessful when it is not indicated in the processing status information even if a specific period of time has elapsed from a request for the restart of the instance of the first parallel distributed processing system that the restart of the instance of the first parallel distributed processing system has successfully been achieved.

BRIEF DESCRIPTION OF THE DRAWINGS

FIG. 3 is a diagram showing an example of counter information shown in FIG. 2;

FIG. 10 is a flowchart of a detailed monitoring process shown in FIG. 9;

FIG. 11A is a flowchart in the case of a successful restart of a web application of an instance of the device management service shown in FIG. 2;

FIG. 11B is a flowchart in the case where a restart of a web application of an instance of the device management service shown in FIG. 2 is unsuccessful, but a restart of the instance is successful;

FIG. 11C is a flowchart in the case where a restart of a web application of an instance of the device management service shown in FIG. 2 is unsuccessful, and a restart of the instance is unsuccessful either;

DETAILED DESCRIPTION

Below, an embodiment of the present disclosure will be described using the drawings.

First, the configuration of a system according to an embodiment of the present disclosure will be described.

Figure 1:
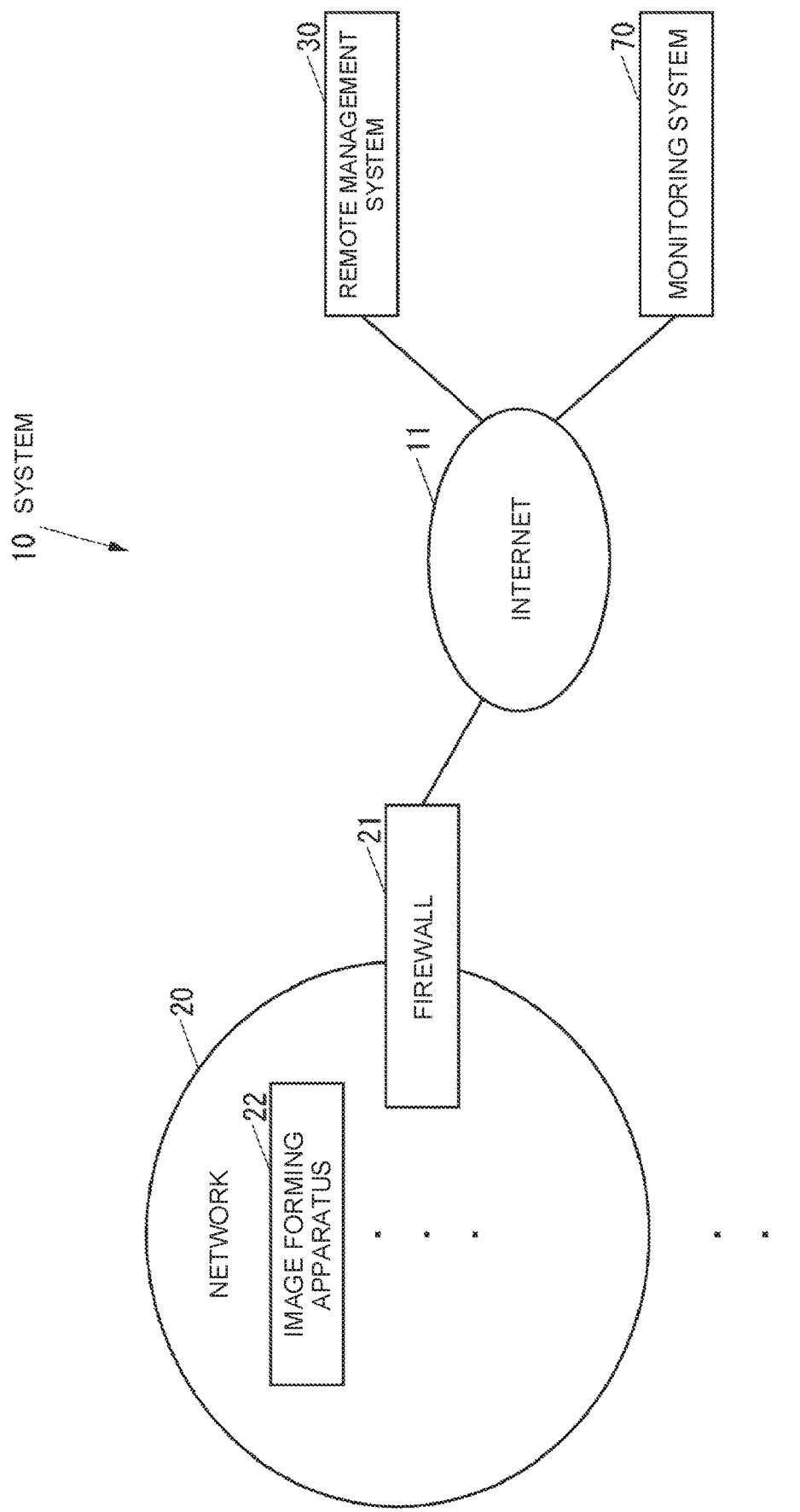
FIG. 1 is a block diagram of a system according to an embodiment of the present disclosure.

FIG. 1 is a block diagram of a system 10 according to an embodiment of the present disclosure.

As shown in FIG. 1, the system 10 includes a network 20, which is a local area network (LAN) or the like belonging to a client of a company (hereinafter referred to as "management company") that manages image forming apparatuses. Aside from the network 20, the system 10 may also include at least one network similar to the network 20.

The network 20 includes a firewall 21 that controls the transmission between the inside of the network 20 and the outside of the network 20, and an image forming apparatus 22. Aside from the image forming apparatus 22, the network 20 may include one or more image forming apparatuses similar to the image forming apparatus 22. The image forming apparatus in the network 20 is, for example, a multifunction peripheral (MFP) or a dedicated printer or the like, and is utilized by a client of the management company.

The system 10 includes a remote management system 30, which is an information processing system that performs remote management of the image forming apparatuses in the system 10. The remote management system 30 may manage, for example, several hundred or another large number of image forming apparatuses distributed around the world. The remote management system 30 is utilized by the management company. The remote management system 30 may include one computer, or multiple computers. Below, the operation of the remote management system 30 on a cloud platform using a public cloud will be described.

Since the remote management system 30 can have many connections with image forming apparatuses over the Internet 11, the capacity of a server constituting the remote management system 30 is expanded responsively along with the increase in number of image forming apparatuses connected with the remote management system 30. Further, since the cloud platform on which the remote management system 30 operates can be subject to system failure or maintenance, part of the system of the cloud platform can go down at times unknown to the remote management system 30.

The system 10 includes a monitoring system 70 that monitors the remote management system 30. The monitoring system 70 is utilized by the management company. The monitoring system 70 may include one computer, or multiple computers.

Individual networks in the system 10, the remote management system 30, and the monitoring system 70 are capable of communicating with each other over the Internet 11.

Figure 2:
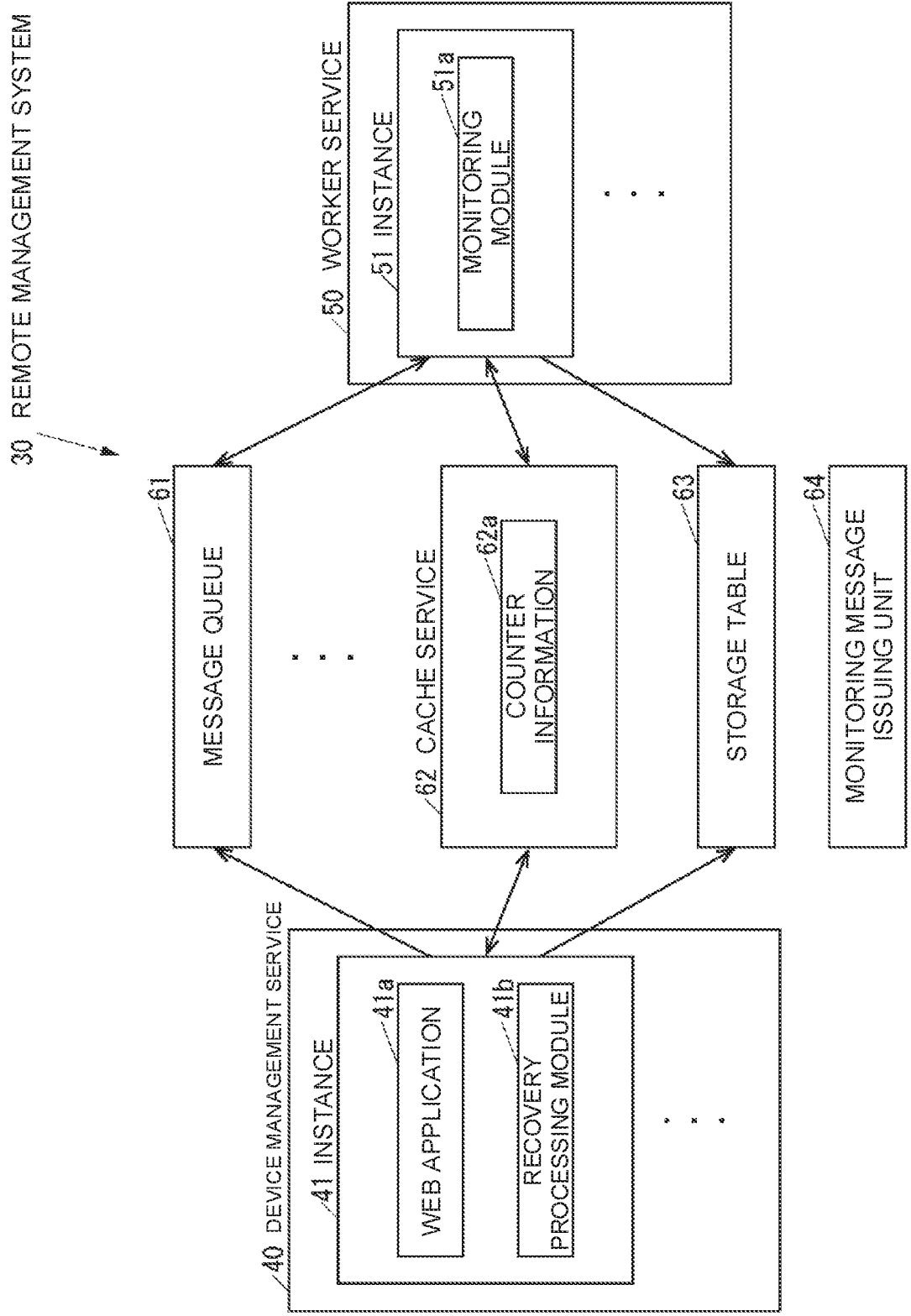
FIG. 2 is a block diagram of a remote management system shown in FIG. 1.

FIG. 2 is a block diagram of the remote management system 30 shown in FIG. 1.

As shown in FIG. 2, the remote management system 30 is a service that handles data transmission to an image forming apparatus under remote management of the remote management system 30. The remote management system 30 includes a device management service 40, which implements a web server for conducting external transmissions, and a worker service 50, which is a service that performs batch processing invisible to users, such as aggregating data, sending email, and making reports.

The device management service 40 includes an instance 41. The instance 41 includes a web application 41a, for example Internet Information Services (IIS), to implement a web server. Aside from the instance 41, the device management service 40 includes one or more instances similar to the instance 41. In other words, the device management service 40 is made to have redundant instances and perform parallel distributed processing through multiple instances, thus constituting the first parallel distributed processing system of the present disclosure. A reason for making the device management service 40 have redundant instances is, for example, that processing can be executed in multiple instances at a high speed or that, when a failure has occurred in one instance, processing can be continued even by a restart of the instance with the failure.

The worker service 50 includes an instance 51. Aside from the instance 51, the worker service 50 includes one or more instances similar to instance 51. In other words, the worker service 50 is made to have redundant instances and perform parallel distributed processing through multiple instances, thus constituting the second parallel distributed processing system of the present disclosure A reason for making the worker service 50 have redundant instances is, for example, that processing can be executed in multiple instances at a high speed or that, when a failure has occurred in one instance, processing can be continued even by a restart of the instance with the failure.

The remote management system 30 includes a message queue 61 to save messages indicating processing to be performed by an instance of the worker service 50. Aside from the message queue 61, the remote management system 30 may include one or more message queues similar to message queue 61. The remote management system 30 has a message queue for each type of processing.

In the remote management system 30, when a user or an image forming apparatus requests some type of processing from the remote management system 30, any instance that is not already processing out of the instances in the device management service 40 saves a message indicating this processing in the message queue depending on the type of processing requested. If there is a waiting message saved in the message queue of the remote management system 30, any instance that is not already processing out of the instances in the worker service 50, after retrieving this message from the message queue, performs the processing depending on this message. After initiating the performance of the processing depending on the message, if the instance of the worker service 50 ends in itself by the restart or the like before ending the performance of the processing, the instance stops the performance of the processing and saves a message indicating the processing in any message queue.

A reason why the remote management system 30 includes both the device management service 40 and the worker service 50 is that the user of the remote management system 30 or the image forming apparatus requests processing from the remote management system 30 via the device management service 40 to be performed by the worker service 50. The user of the remote management system 30 or the image forming apparatus can immediately finish the process with the device management service 40, and as a result, the user of the remote management system 30 or the image forming apparatus can request new processing from the remote management system 30 via the device management service 40.

The remote management system 30 includes a cache service 62 that stores counter information 62a having a counter that can be read or written by both the device management service 40 and the worker service 50.

FIG. 3 is a diagram showing an example of the counter information 62a shown in FIG. 2.

As shown in FIG. 3, the counter information 62a includes identifying information for the instances of the device management service 40 (hereinafter referred to as "instance ID"), the value of a counter for instances attached to this instance ID, (hereinafter referred to as "counter value"), and a time, all in association with one another, for each instance of the device management service 40. The processing status information of the present disclosure is represented as the counter information 62a, which is information having, for the instances of the device management service 40, the status of the processing related to the recovery of each instance of the device management service 40. Furthermore, the processing status storage unit of the present disclosure is represented by the cache service 62.

As shown in FIG. 2, the remote management system 30 includes a storage table 63 that stores various information such as the log of the remote management system 30. The storage table 63 is monitored by the monitoring system 70 (see FIG. 1).

The instance 41 of the device management service 40 includes a recovery processing module 41b that performs internal processing required for recovery from a failure that occurs in the instance 41.

Examples of the internal processing performed by the recovery processing module in the instance of the device management service 40 include processing for outputting a memory dump of the web server of the instance, called "dump output," and processing for restarting a web application inside the instance, called "application restart."

The dump output is the processing, in which, when it is determined that a target instance of the device management service 40 does not accept an external request, a memory dump of the web server of this instance is acquired and transferred at the point in time when it is determined that this instance does not accept the external request, so as to facilitate later failure analysis. The application restart is a recovery process for restarting a web application inside a target instance of the device management service 40 to make it possible for the instance to accept a new request. The dump output is always executed before the application restart is executed.

The instance 51 in the worker service 50 includes a monitoring module 51a that monitors an instance of the device management service 40. The monitoring module 51a executes three processes, a process for monitoring whether an interruption of an instance of the device management service 40 occurs (vital monitoring), a process for monitoring the progress of a recovery process by an instance of the device management service 40 (recovery status monitoring), and a process for the determination of report (report determination).

The vital monitoring is a process for monitoring an instance of the device management service 40 from the worker service 50 about the occurrence of an interruption such as a 503 hypertext transfer protocol (HTTP) error due to an overload of processing.

The recovery status monitoring is a process on the operating system (OS) level that causes an operation to restart any instance that has been deployed by the device management service 40 in the public cloud on which the remote management system 30 operates, and is an instance restart that is conducted when an application restart did not result in a recovery from a failure. For example, when there is a failure due to an overload from outside the remote management system 30, or when there is a failure in the instance of the device management service 40 itself rather than a failure in the web application, once the application restart is implemented by recovery processing module 41b of the device management service 40 and does not resolve the failure, recovery status monitoring causes an instance restart to be requested from the public cloud side. When the instance restart is requested by the monitoring module 51a of the worker service 50, the public cloud conducts an instance restart by restarting the target instance.

The report determination is a process that stores a report log in the storage table 63 so that when the instance restart does not cause recovery from a failure, the remote management system 30 can send a report that the autonomous recovery process is unsuccessful to the monitoring system 70.

The remote management system 30 includes a monitoring message issuing unit 64 that regularly, for example every five minutes, issues a message (hereinafter referred to as "monitoring message") to the worker service 50 for the process of monitoring the instances in the device management service 40 (hereinafter referred to as "monitoring process").

Figure 4:
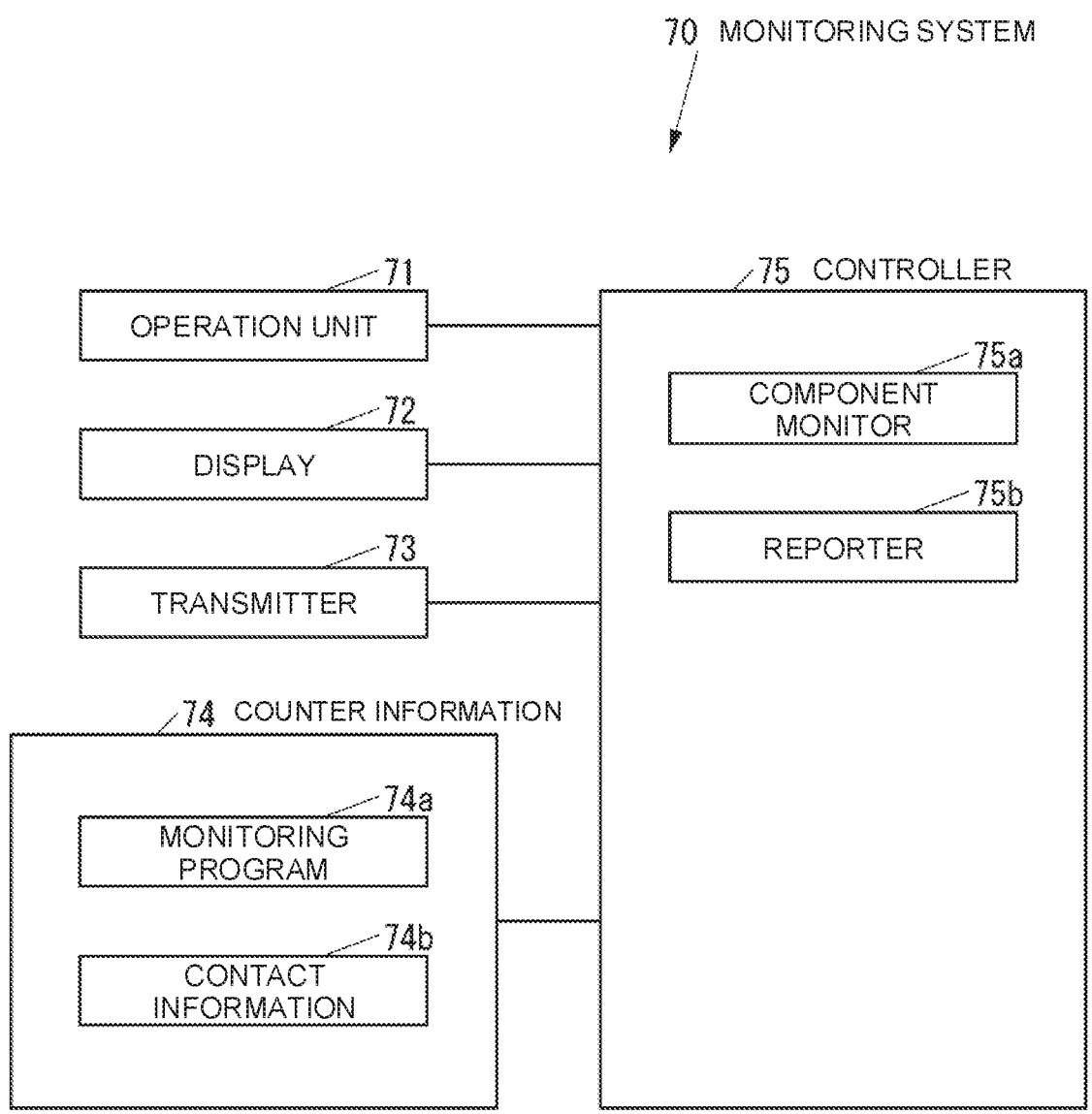
FIG. 4 is a block diagram of a monitoring system shown in FIG. 1, represented as one computer.

FIG. 4 is a block diagram of the monitoring system 70, represented as one computer.

The monitoring system 70 shown in FIG. 4 includes an operation unit 71, which has various operation devices receiving various inputs such as, for example, a keyboard or a mouse. The monitoring system 70 also includes a display 72, which is a display device such as, for example, a liquid crystal display (LCD) that displays various information. The monitoring system 70 also includes a transmitter 73, which is a transmission device that transmits to outside devices, either over a network such as a local area network (LAN), or the Internet, or without a network, over a direct wired or wireless connection. The monitoring system 70 also includes a storage device 74, which is a non-volatile storage medium that stores various information, such as a semiconductor memory or a hard disk drive (HDD), and a controller 75 which controls the entirety of the monitoring system 70.

The storage device 74 stores a monitoring program 74a that monitors the remote management system 30 (see FIG. 2). The monitoring program 74a may be installed in, for example, the monitoring system 70 during the manufacturing stage of the monitoring system 70, or it may be installed in the monitoring system 70 from an external recording medium such as a compact disk (CD), a digital versatile disk (DVD), or a universal serial bus (USB), or it may be installed in the monitoring system 70 from a network.

The storage device 74 stores contact information 74b, which has various information about contact details. The contact details in the contact information 74b are, for example, electronic mail (email) addresses. The contact information 74b may have many contact details, for example, the contact details of the developer of the remote management system 30 or the contact details of the users of the remote management system 30.

The controller 75 includes, for example, a central processing unit (CPU), read only memory (ROM) which stores programs and various data, and random access memory (RAM) which is used as a workspace of the CPU of the controller 75. The CPU of the controller 75 executes programs stored in the storage device 74 or in the ROM of the controller 75.

Based on the execution of the monitoring program 74a, the controller 75 causes a component monitor 75a to monitor the components of the remote management system 30 and a reporter 75b to send a report with the contact details indicated in the contact information 74b when a monitored result from the component monitor 75a fulfills a previously determined condition.

Next, the operation of the system 10 will be described.

First, the operation of the recovery processing module when an instance is started will be described.

Figure 5:
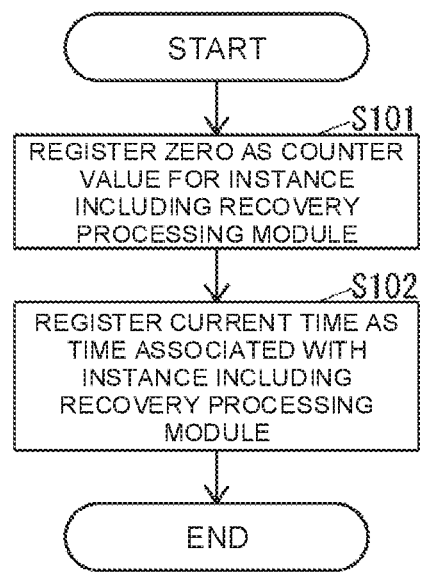
FIG. 5 is a flowchart of operations of a recovery processing module shown in FIG. 2 when an instance is started.

FIG. 5 is a flowchart of the operations of the recovery processing module when an instance is started.

When an instance of the device management service 40 is started, the recovery processing module of this instance performs the operations shown in FIG. 5.

As shown in FIG. 5, the recovery processing module registers zero in the counter information 62a as the counter value for the instance, which includes the recovery processing module (S101).

Next, the recovery processing module registers the current time in the counter information 62a as the time associated with the instance, which includes the recovery processing module, (S102) and ends the operations shown in FIG. 5.

Next, the operation of the recovery processing module when a web application is started inside the instance will be described.

Figure 6:
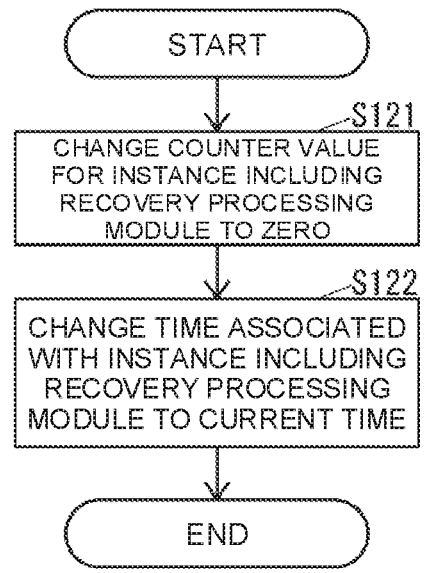
FIG. 6 is a flowchart of operations of the recovery processing module shown in FIG. 2 when a web application is started inside the instance.

FIG. 6 is a flowchart of the operation of the recovery processing module when a web application is started inside the instance.

When, for example, an instance of the device management service 40 is started, the instance starts a web application inside the instance itself. Further, the instance of the device management service 40 may also restart the web application. When a web application is started inside the instance of the device management service 40, the recovery processing module of this instance performs the operations shown in FIG. 6.

As shown in FIG. 6, the recovery processing module changes the counter value for the instance, which includes the recovery processing module, to zero in the counter information 62a (S121).

Next, the recovery processing module changes the time associated with the instance, which includes the recovery processing module, to the current time in the counter information 62a (S122), and ends the operations shown in FIG. 6.

Next, the operation of the recovery processing module after a web application is started inside the instance will be described.

Figure 7:
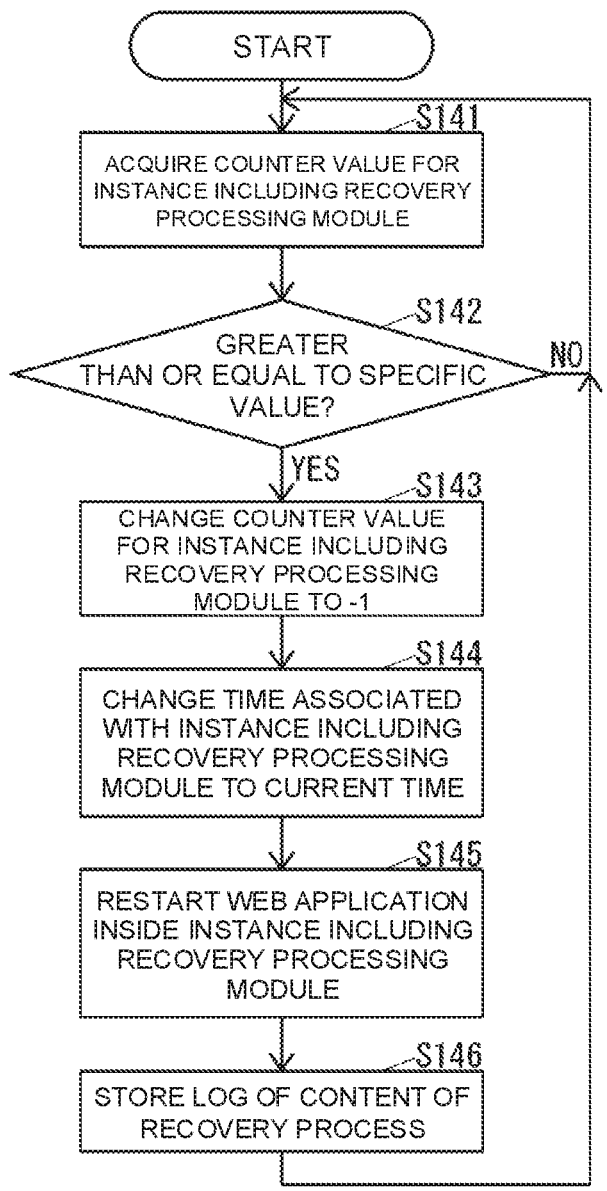
FIG. 7 is a flowchart of operations of the recovery processing module shown in FIG. 2 after the web application is started inside the instance.

FIG. 7 is a flowchart of the operation of the recovery processing module after the web application is started inside the instance.

When a web application is started inside an instance of the device management service 40, the recovery processing module of this instance performs the operations shown in FIG. 7.

As shown in FIG. 7, the recovery processing module acquires the counter value for the instance, which includes the recovery processing module, from the counter information 62a based on the instance ID of the instance (S141).

Next, the recovery processing module determines whether the counter value acquired in S141 is greater than or equal to a specific value (S142). The specific value in S142 can be 5, for example.

When the recovery processing module determines in S142 that the counter value acquired in S141 is not greater than or equal to the specific value, the recovery processing module performs the processing of S141.

When the recovery processing module determines in S142 that the counter value acquired in S141 is greater than or equal to the specific value, the recovery processing module changes the counter value for the instance, which includes the recovery processing module, to −1 in the counter information 62a (S143).

Next, the recovery processing module changes the time associated with the instance, which includes the recovery processing module, to the current time in the counter information 62a (S144).

Next, the recovery processing module restarts the web application inside the instance, which includes the recovery processing module (S145).

Next, the recovery processing module stores a log of the content of the recovery process of S145 in the storage table 63 (S146), and performs the processing of S141.

Next, the operation of the monitoring module in an instance of the worker service 50 when performing a monitoring process will be described.

Figure 8:
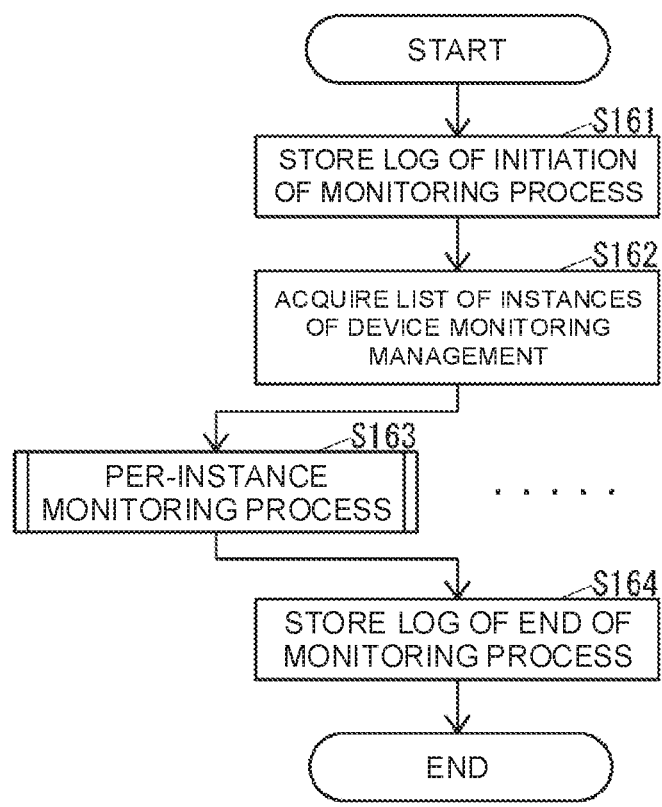
FIG. 8 is a flowchart of operations of the monitoring module shown in FIG. 2 when a monitoring process is executed.

FIG. 8 is a flowchart of the operation of the monitoring module in an instance of the worker service 50 when a monitoring process is performed.

The monitoring message issuing unit 64 periodically issues a monitoring message, for example, every 5 minutes, and saves this monitoring message in a message queue for the monitoring process (hereinafter referred to as "monitoring message queue"). If there is a waiting monitoring message saved in the monitoring message queue, any instance that is not already processing out of the instances in the worker service 50, after retrieving this monitoring message from the monitoring message queue, performs the monitoring process depending on this monitoring message as shown in FIG. 8.

As shown in FIG. 8, the monitoring module in the instance that, out of the instances of the worker service 50, performs the operations shown in FIG. 8 (hereinafter referred to as "target monitoring module") stores a log of the initiation of the current monitoring process in the storage table 63 (S161).

Next, the target monitoring module acquires a list of instances of the device management service 40 from the public cloud (S162).

Next, the target monitoring module executes the per-instance monitoring process, which is a process executed for each instance of the device management service 40 in parallel for each of the instances shown in the list acquired in S162 (S163).

Figure 9:
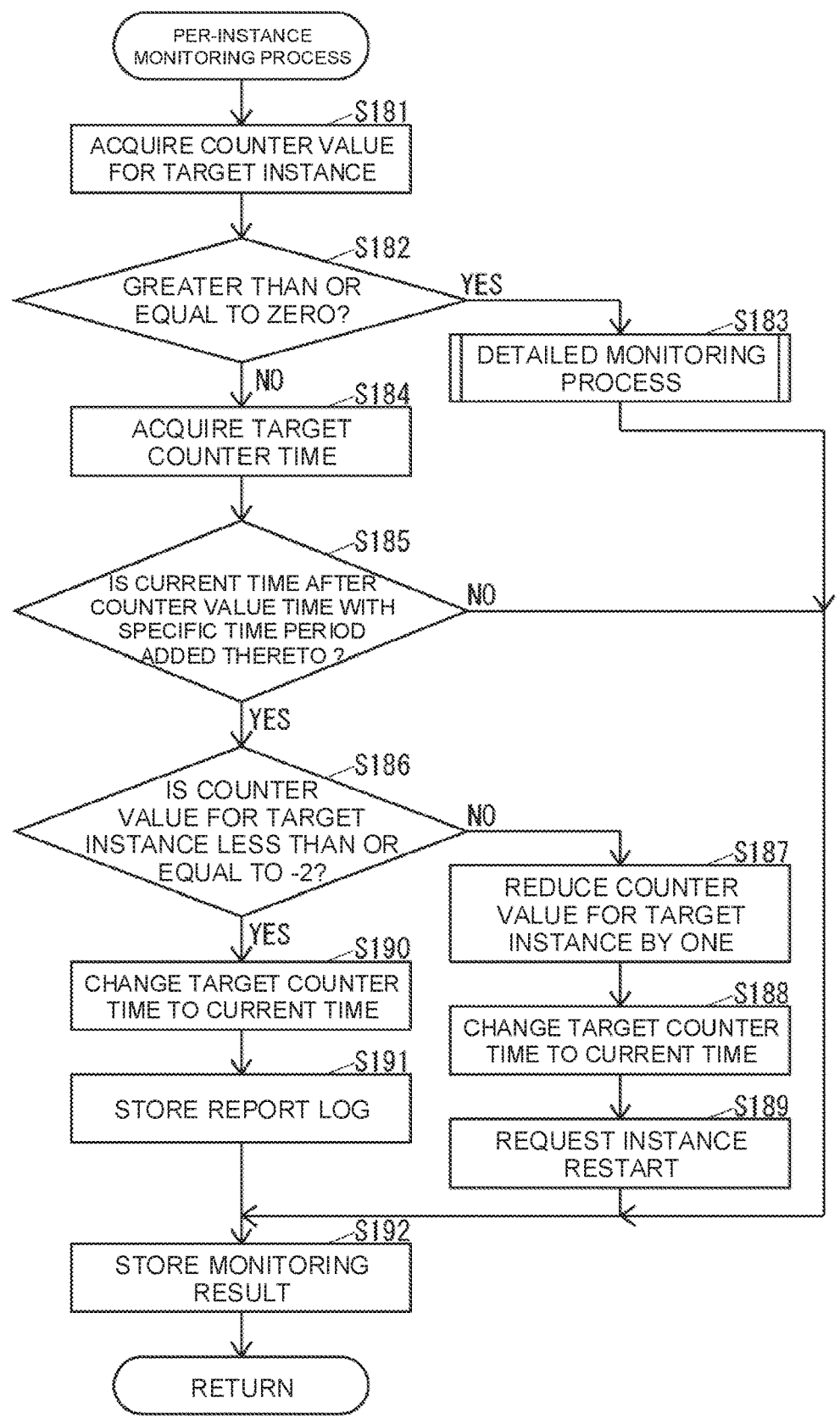
FIG. 9 is a flowchart of a per-instance monitoring process shown in FIG. 8.

FIG. 9 is a flowchart of a per-instance monitoring process shown in FIG. 8.

As shown in FIG. 9, the target monitoring module acquires the counter value based on the instance ID in the counter information 62a for the instance out of the instances in the device management service 40 that is the target of the current per-instance monitoring process (the instance being referred to below as "target instance" in the description on the operations shown in FIG. 9 and FIG. 10) (S181).

Next, the target monitoring module determines whether the counter value acquired in S181 is greater than or equal to zero (S182).

When the target monitoring module determines in S182 that the counter value acquired in S181 is greater than or equal to zero, the target monitoring module executes the detailed monitoring process shown in FIG. 10 (S183).

FIG. 10 is a flowchart of a detailed monitoring process shown in FIG. 9.

As shown in FIG. 10, the target monitoring module makes a web request for monitoring the target instance (S201).

Next, the target monitoring module sets a request timeout value to a specific period of time and executes the web request made in S201 (S202).

The processing of S201 and S202 is processing related to the vital monitoring described above.

After the processing of S202, the target monitoring module determines the result of the execution of S202 (S203).

When the target monitoring module determines in S203 that the result of the execution of S202 is that a normal response has arrived from the target instance based on the web request executed in S202, the target monitoring module changes the counter value for the target instance in the counter information 62a to zero (S204), and changes the time associated with the target instance in the counter information 62a (hereinafter referred to as "target counter time") to the current time (S205).

When the target monitoring module determines in S203 that the result of the execution of S202 is a 503 HTTP error or a timeout depending on the request timeout value set in S202, the target monitoring module then determines whether the counter value for the target instance in the counter information 62a is greater than or equal to a specific threshold (S206). The threshold value in S206 is, for example, a positive value such as 10.

When the target monitoring module determines in S206 that the counter value for the target instance in the counter information 62a is not greater than or equal to the specific threshold value, the target monitoring module then increases the counter value by one for the target instance in the counter information 62a (S207), and changes the target counter time to the current time (S208).

When the target monitoring module determines in S206 that the counter value for the target instance in the counter information 62a is greater than or equal to the specific threshold value, the target monitoring module then changes the counter value for the target instance in the counter information 62a to −2 (S209), and changes the target counter time to the current time (S210).

Next, the target monitoring module requests an instance restart from the public cloud side relating to the target instance (S211).

When the target monitoring module determines in S203 that the result of the execution of S202 is an error that is neither a 503 HTTP error nor a timeout, the target monitoring module stores a log of this error in the storage table 63 (S212).

After the processing of S205, S208, S211 or S212, the target monitoring module ends the detailed monitoring process shown in FIG. 10.

As shown in FIG. 9, when the target monitoring module determines in S182 that the counter value acquired in S181 is not greater than or equal to zero, the target monitoring module acquires the target counter time (S184).

Next, the target monitoring module determines whether the current time is after the target counter time acquired in S184 and having the specific period of time added thereto (S185). The specific period of time in S185 can be, for example, 20 minutes.

When the target monitoring module determines in S185 that the current time is after the target counter time added to the specific period of time, the target monitoring module then determines whether the counter value for the target instance in the counter information 62a is less than or equal to −2 (S186).

When the target monitoring module determines in S186 that the counter value for the target instance in the counter information 62a is not less than or equal to −2, the target monitoring module then decreases the counter value by one for the target instance in the counter information 62a (S187), and changes the target counter time to the current time in the counter information 62a (S188).

Next, the target monitoring module requests an instance restart from the public cloud side relating to the target instance (S189).

The processing of S182 and S184 through S189 is processing related to the above recovery status monitoring.

When the target monitoring module determines in S186 that the counter value for the target instance in the counter information 62a is less than or equal to −2, it changes the target counter time in the counter information 62a to the current time (S190).

Next, the target monitoring module stores the report log for reporting to the monitoring system 70 that the autonomous recovery process by the remote management system 30 was unsuccessful in the storage table 63 (S191).

The processing of S182, S184 through S186, and S190 through S191 is processing related to the report determination described above.

When the target monitoring module ends the processing of S183, or determines that the current time is not after the target counter time added to the specific period of time in S185, or finishes the processing of S189 or S191, the target monitoring module then stores the monitoring result of the current monitoring process in the storage table 63 (S192), and ends the per-instance monitoring process shown in FIG. 9.

As shown in FIG. 8, after the processing of S163, the target monitoring module stores a log of the end of the current monitoring process in the storage table 63 (S164), and ends the operation shown in FIG. 8.

Next, several types of process patterns of the failure recovery process of the device management service 40 in the remote management system 30 will be described.

In the following, the specific value in S142, the specific period of time in S185, and the threshold in S206 are 5, 20 minutes, and 10, respectively.

Figure 12A:
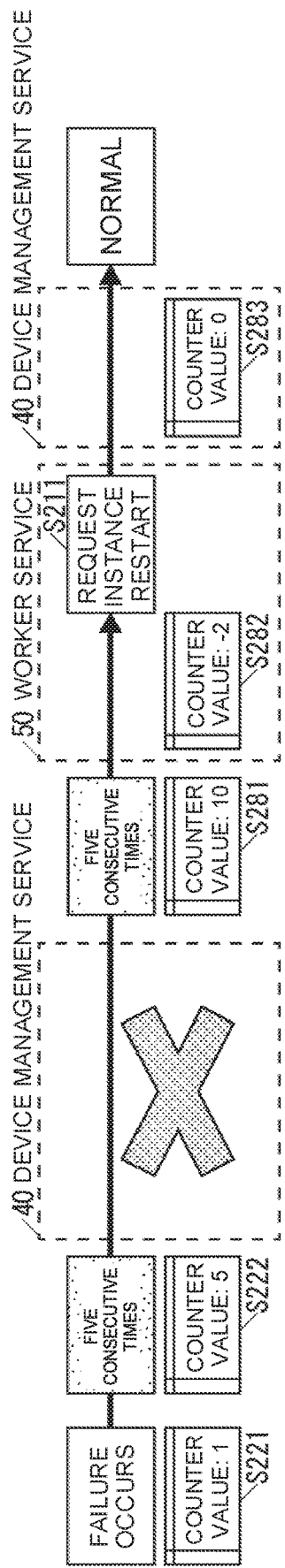
FIG. 12A is a flowchart in the case where a restart of a web application of an instance of the device management service shown in FIG. 2 is not initiated, but a restart of the instance is successful.
Figure 12B:
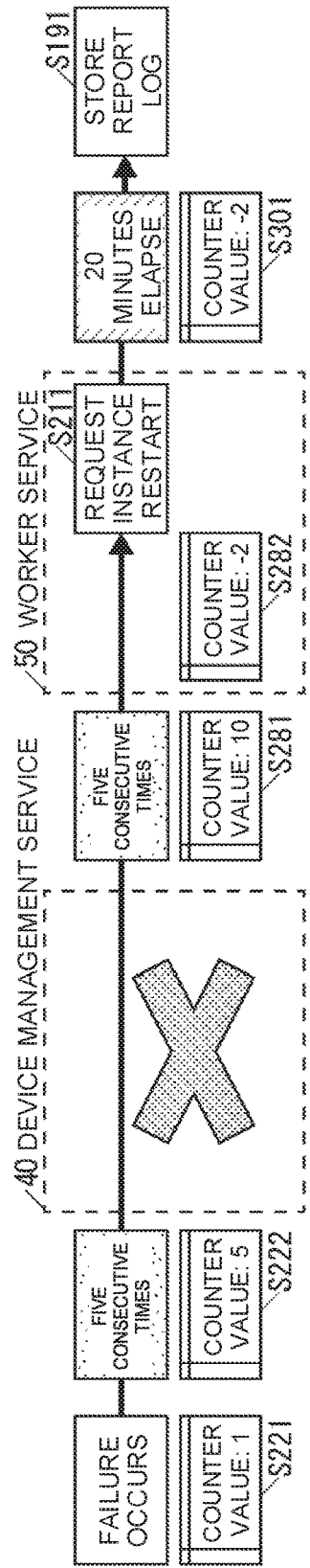
FIG. 12B is a flowchart in the case where a restart of a web application of an instance of the device management service shown in FIG. 2 is not initiated, and a restart of the instance is unsuccessful.

FIG. 11A is a flowchart in the case of a successful restart of a web application of an instance of the device management service 40. FIG. 11B is a flowchart in the case of an unsuccessful restart of a web application of an instance of the device management service 40, but the restart of this instance is successful. FIG. 11C is a flowchart in the case of an unsuccessful restart of a web application of an instance of the device management service 40, and the restart of this instance is unsuccessful. FIG. 12A is a flowchart in a case where a restart of a web application of the instance of the device management service 40 is not initiated, but the restart of this instance is successful. FIG. 12B is a flowchart in a case where a restart of a web application of the instance of the device management service 40 is not initiated, and the restart of this instance is unsuccessful.

When the operations shown in FIG. 11A, FIG. 11B, FIG. 11C, FIG. 12A, and FIG. 12B are described, description is made on one instance representing all the instances of the device management service 40 (the instance being referred to below as "target instance" in the description on the operations shown in FIG. 11A, FIG. 11B, FIG. 11C, FIG. 12A, and FIG. 12B).

First, the case of a successful restart of a web application of an instance of the device management service 40 will be described with reference to FIG. 11A.

When the target instance of the device management service 40 is started, the web application is started inside the target instance, and the counter value for the target instance is set to zero by the recovery processing module of the target instance based on the processing of S101 and the processing of S121. Furthermore, if the target instance of the device management service 40 is normal (NORMAL in S203), the counter value for the target instance is set to 0 by a monitoring module of any instance of the worker service 50 (S204). Therefore, until a failure occurs in the target instance of the device management service 40, the counter value for the target instance is zero.

As shown in FIG. 11A, when a failure occurs in the target instance of the device management service 40, a 503 HTTP error or a timeout occurs with respect to a web request for monitoring from the monitoring module in any instance of the worker service 50 (503 HTTP ERROR OR TIMEOUT in S203), so that the counter value is set to one for the target instance of the device management service 40 by the monitoring module of that instance of the worker service 50 based on the processing of S207 (S221).

In a similar way, when a 503 HTTP error or a timeout in the target instance of the device management service 40 occurs five consecutive times with respect to web requests for monitoring from a monitoring module in any instance of the worker service 50, the counter value for the target instance of the device management service 40 is set to five by monitoring modules in these instances of the worker service 50 based on the processing of S207 performed five times in total (S222).

Then, when the counter value for the target instance of the device management service 40 becomes greater than or equal to five, (YES in S142), this counter value is set to −1 during the processing of S143 by the recovery processing module of the target instance (S223), and the web application inside the target instance is restarted based on the processing of S145 by that recovery processing module.

When the restart of the web application inside the target instance of the device management service 40 is successful, the counter value for the target instance is set to 0 by the recovery processing module of the target instance based on the processing of S121 (S224). When the restart of the web application of the target instance is successful, the target instance is then normal.

Next, an unsuccessful restart of a web application of an instance of the device management service 40, but a successful restart of this instance will be described with reference to FIG. 11B.

As described above, the counter value for the target instance of the device management service 40 is 0 until a failure occurs in the target instance.

As shown in FIG. 11B, S221 through S223 are similar to the processing shown in FIG. 11A.

After the processing of S223, when the restart of the web application in the target instance of the device management service 40 is unsuccessful, the counter value for the target instance is not set to 0 by the recovery processing module of the target instance. Directly after this counter value is set to −1 by the process of S143, although 20 minutes elapse from the time associated with the target instance when changed by the recovery processing module of the target instance of the processing of S144, this counter value remains −1 (S241).

After the web application of the target instance of the device management service 40 is restarted during the processing of S145 by the recovery processing module of the target instance, when the counter value for the target instance is left at −1 and 20 minutes elapse from the time associated with the target instance of the device management service 40 (YES in S185), the counter value for the target instance is set to −2 by the monitoring module of any instance of the worker service 50 during the process of S187 (S242). This monitoring module requests a restart of the target instance of the device management service 40 during the processing of S189.

When the target instance of the device management service 40 is successfully restarted, the web application is started inside the target instance, and the counter value for the target instance is set to 0 by the recovery processing module of the target instance based on the processing of S101 and the processing of S121 (S243). When the restart of the target instance of the device management service 40 is successful, the target instance is then normal.

Next, an unsuccessful restart of a web application of an instance of the device management service 40, and an unsuccessful restart of this instance will be described with reference to FIG. 11C.

As described above, until a failure occurs in the target instance of the device management service 40, the counter value for the target instance is zero.

As shown in FIG. 11C, S221 through S223 and S241 through S242 are similar to the processing shown in FIG. 11B.

After the end of the processing of S242, when the restart of the target instance of the device management service 40 is unsuccessful, the counter value for the target instance is not set to 0 by the recovery processing module of the target instance. Directly after this counter value is set to −2 based on processing of S187, although 20 minutes elapse from the time associated with the target instance when changed by the monitoring module of any instance of the worker service 50 in the processing of S188, this counter value remains −2 (S261).

After a restart of the target instance of the device management service 40 is requested based on the processing of S189, based on the monitoring module of any instance of the worker service 50, the counter value for the target instance is left at −2. When 20 minutes elapse after the time associated with the target instance (YES in S185), based on the monitoring module of any instance of the worker service 50, a report log is stored in the storage table 63 based on the processing of S191. When the report log is stored in the storage table 63, the monitoring system 70 that monitors the storage table 63 reports an unsuccessful autonomous recovery process by the remote management system 30 related to the target instance based on the report log stored in the storage table 63. The contact details indicated by the contact information 74b is reported by email. Next, the person who checks this email executes a failure recovery process for the remote management system 30.

Next, a case where a restart of a web application of an instance of the device management service 40 is not initiated, but a restart of this instance is successful will be described with reference to FIG. 12A.

As described above, until a failure occurs in the target instance of the device management service 40, the counter value for the target instance is zero.

As shown in FIG. 12A, S221 through S222 are similar to the processing shown in FIG. 11A.

However, when a failure occurs in the target instance of the device management service 40, even if the counter value for the target instance becomes greater than or equal to 5, this counter value is not set to −1 by the recovery processing module of the target instance and the web application inside the target instance is not restarted.

Therefore, a 503 HTTP error or a timeout occurs in the target instance of the device management service 40 another five consecutive times with respect to web requests for monitoring from the monitoring module of any instance of the worker service 50, resulting in a total of ten consecutive times. Then, the counter value for the target instance of the device management service 40 is set to ten during the processing of S207 performed a total of ten times by the monitoring modules of these instances of the worker service 50 (S281).

Then, when the counter value for the target instance of the device management service 40 becomes greater than or equal to 10 (YES in S206), this counter value is set to −2 based on the processing of S209 by the monitoring module of any instance of the worker service 50 (S282). Then, this monitoring module requests a restart of the target instance during the processing of S211.

Since the target instance of the device management service 40 is successfully restarted, the web application is started inside the target instance, and the counter value for the target instance is set to 0 by the recovery processing module of the target instance based on the processing of S101 and the processing of S121 (S283). When the restart of the target instance of the device management service 40 is successful, the target instance is then normal.

Next, a case where a restart of a web application of an instance of the device management service 40 is not initiated, and a restart of this instance is unsuccessful will be described with reference to FIG. 12B.

As described above, until a failure occurs in the target instance of the device management service 40, the counter value for the target instance is zero.

As shown in FIG. 12B, S221 through S222 and S281 through S282 are similar to the processing shown in FIG. 12A.

After the processing of S282, when the restart of the target instance of the device management service 40 is unsuccessful, the counter value for the target instance is not set to zero by the recovery processing module of the target instance. Directly after this counter value is set to −2 based on the processing of S209, although 20 minutes elapse from the time associated with the target instance when changed by the monitoring module of any instance of the worker service 50 during the processing of S210, this counter value remains −2 (S301).

After a restart of the target instance of the device management service 40 is requested by the monitoring module of any instance of the worker service 50 based on the processing of S211, the counter value for the target instance is left at −2. When 20 minutes elapse from the time associated with the target instance (YES in S185), based on the monitoring module of any instance of the worker service 50, a report log is stored in the storage table 63 based on the processing of S191. When the report log is stored in the storage table 63, the monitoring system 70 that monitors the storage table 63 reports an unsuccessful autonomous recovery process by the remote management system 30 related to the target instance based on the report log stored in the storage table 63. The contact details indicated by the contact information 74b is reported by email. Next, the person who checks this email executes a failure recovery process for the remote management system 30.

As described above, each of the instances of the device management service 40 acquires the status of processing related to the recovery of the relevant instance from the counter information 62a (S141), and stores the status of the processing related to the recovery of the instance itself in the counter information 62a when having performed the processing (S101 through S102, S121 through S122, and S143 through S144). Further, each of the instances of the worker service 50 acquires the status of processing related to the recovery of an instance of the device management service 40 from the counter information 62a (S181, S184), and stores the status of the processing related to the recovery of the instance of the device management service 40 in the counter information 62a when having performed the processing (S187 through S188, S190, S204 through S205, S207 through S208, and S209 through S210). Owing to such configuration, the remote management system 30 performs the processing related to the recovery of the instance of the device management service 40 though the instance itself of the device management service 40 and the instance of the worker service 50, so that a standby system corresponding to the device management service 40 is unnecessary and operating costs can be reduced.

The monitoring modules of the instances of the worker service 50 write the status of the processing related to the recovery of the instance of the device management service 40 into the counter information 62a of the cache service 62 which is independent of both the worker service 50 and the device management service 40. Consequently, although the remote management system 30 has the configuration, in which the device management service 40 and the worker service 50 each have multiple redundant instances, the remote management system 30 continues operation without problems even if the number of instances changes, and is capable of implementing appropriate failure detection and appropriate autonomous recovery.

In the remote management system 30, when it is indicated in the counter information 62a that the status of the monitoring of a failure in the instance of the device management service 40 by the instance of the worker service 50 has become a specific status (YES in S142), the instance of the device management service 40 restarts the web application of the instance itself as the processing related to the recovery of the instance itself (S145). Owing to such configuration, the remote management system 30 restarts the web application of the instance of the device management service 40 depending on the status of the monitoring of a failure in the instance of the device management service 40 by the instance of the worker service 50, and is thus capable of implementing the restart of the application of the instance of the device management service 40 at appropriate timing.

In the remote management system 30, when it is not indicated in the counter information 62a after a specific period of time since the restart of the web application of the instance of the device management service 40 that the restart of the application has successfully been achieved (YES in S185 and NO in S186), the instance of the worker service 50 requests a restart of the instance of the device management service 40 (S189). Owing to such configuration, the remote management system 30 can execute the restart of the instance of the device management service 40 at appropriate timing when the restart of the web application of the instance of the device management service 40 is unsuccessful.

In the remote management system 30, when it is not indicated in the counter information 62a after a specific period of time since the request to restart the instance of the device management service 40 that the restart of the instance of the device management service 40 has successfully been achieved (YES in S185 and YES in S186), the instance of the worker service 50 performs processing (S191) for sending a report that the autonomous recovery process was unsuccessful. Owing to such configuration, the remote management system 30 performs processing to report an unsuccessful autonomous recovery process when the restart of the instance of the device management service 40 was unsuccessful, which makes it possible to improve the chance of undergoing a human based recovery process at appropriate timing.

The processing status storage unit of the present disclosure is represented as the cache service 62, but may be a storage unit other than a cache service. For example, the processing status storage unit of the present disclosure may be a database or a storage table.

What is claimed is:

1. An information processing system comprising:
a hardware processor executing computer instructions including
  a device management service that includes two or more first instances and performs parallel distributed processing through the two or more first instances, and
  a worker service that includes two or more second instances and performs parallel distributed processing through the two or more second instances; and
a processing status storage unit that stores processing status information indicating a status of processing related to a recovery of the first instances, wherein
the first instance includes a recovery processing module that performs a processing related to the recovery of the first instance itself to register the processing status information in the processing status storage unit, and
the second instance includes a monitoring module that performs a monitoring process of the processing related to the recovery performed by the recovery processing module in the first instance, on the basis of the processing status information registered in the processing status storage unit to change the processing status information stored in the processing status storage unit,
wherein the processing related to the recovery of the first instance itself includes processing for outputting a memory dump of the web server of the first instance and processing for restarting a web application inside the first instance, the recovery processing module executing the processing for outputting the memory dump, before the processing for restarting is executed, and
wherein the monitoring process of the processing related to the recovery includes a process for monitoring whether an interruption of the first instance occurs, a process for monitoring progress of a recovery process by the first instance, and a process that stores a report log in a storage table when the recovery process does not cause recovery from a failure.

2. The information processing system according to claim 1, wherein the recovery processing module included in the first instance restarts an application in the first instance as processing related to a recovery of the first instance itself when it is indicated in the processing status information that a status of monitoring of a failure in the first instance by the monitoring module included in the second instance has become a specific status.

3. The information processing system according to claim 2, wherein the monitoring module included in the second instance requests a restart of the first instance when it is not indicated in the processing status information even if a specific period of time has elapsed from a restart of the application included in the first instance that the restart of the application has successfully been achieved.

4. The information processing system according to claim 3, wherein the monitoring module included in the second instance performs processing to report that an autonomous recovery process was unsuccessful when it is not indicated in the processing status information even if a specific period of time has elapsed from a request for the restart of the first instance that the restart of the first instance has successfully been achieved.

* * * * *